United States Patent
Ostergaard et al.

(10) Patent No.: US 10,057,831 B2
(45) Date of Patent: Aug. 21, 2018

(54) COMMUNICATIONS

(75) Inventors: Paul Frderick Norwood Ostergaard, Nedlands (AU); Andrew Phillip Mason, Nedlands (AU); David Alexander Wilson, Nedlands (AU)

(73) Assignee: Norwood Systems (Aust) Pty Ltd, Nedlands (AU)

( * ) Notice: Subject to any disclaimer, the term of this patent is extended or adjusted under 35 U.S.C. 154(b) by 701 days.

(21) Appl. No.: 14/114,637

(22) PCT Filed: Apr. 27, 2012

(86) PCT No.: PCT/AU2012/000438
§ 371 (c)(1),
(2), (4) Date: Jun. 25, 2014

(87) PCT Pub. No.: WO2012/145792
PCT Pub. Date: Nov. 1, 2012

(65) Prior Publication Data
US 2014/0302852 A1  Oct. 9, 2014

(30) Foreign Application Priority Data
Apr. 29, 2011  (AU) ................................. 2011901585

(51) Int. Cl.
*H04W 36/32*  (2009.01)
(52) U.S. Cl.
CPC .................................. *H04W 36/32* (2013.01)

(58) Field of Classification Search
CPC ............. H04M 2250/12; H04W 48/04; H04W 64/006; H04W 36/32; G01S 5/0009; G01S 19/49; G01S 19/52; G01S 3/14; G01S 3/38
See application file for complete search history.

(56) References Cited

U.S. PATENT DOCUMENTS

| | | | | |
|---|---|---|---|---|
| 6,522,266 B1* | 2/2003 | Soehren | ............... | A61B 5/7264 340/988 |
| 2007/0018811 A1* | 1/2007 | Gollu | ................... | G06Q 10/087 340/539.13 |
| 2011/0034171 A1* | 2/2011 | Choi | ...................... | H04B 7/024 455/436 |
| 2012/0163206 A1* | 6/2012 | Leung | ................... | G01S 5/0009 370/252 |

(Continued)

*Primary Examiner* — Joseph Dean, Jr.
(74) *Attorney, Agent, or Firm* — Suzannah K. Sundby, Esq.; Canady + Lortz LLP

(57) ABSTRACT

A system (10) for implementing an action on or associated with a wireless communication network (26), the system comprising: a wireless communication enabled device (24) operable to communicate with the wireless communication network; and at least one sensor (50) for sensing and gathering sensor data relating to a state of the wireless communication enabled device or a state of the environment surrounding the wireless communication enabled device, wherein the wireless communication enabled device comprises an estimation means (62) for receiving the sensor data and estimating the state of the wireless communication enabled device based on the sensor data, and a decision means (64) for determining whether to implement the action based on the estimated state of the wireless communication enabled device.

79 Claims, 7 Drawing Sheets

(56) References Cited

U.S. PATENT DOCUMENTS

| | | | |
|---|---|---|---|
| 2012/0231828 A1* | 9/2012 | Wang | H04W 74/0833 455/509 |
| 2012/0259578 A1* | 10/2012 | Bevilacqua | G06F 1/1694 702/141 |
| 2012/0330544 A1* | 12/2012 | Joong | G01C 21/3605 701/408 |

* cited by examiner

COMMUNICATIONS

RELATED APPLICATIONS

This application is a national phase filing under 35 U.S.C. 371 of International Application No. PCT/AU2012/000438, filed Apr. 27, 2012, which claims the benefit of and priority to Australian Provisional Patent Application No. 2011901585, filed Apr. 29, 2011, all of these applications are incorporated herein by reference in their entireties.

TECHNICAL FIELD

The present invention relates generally to communications, and in particular, to a system and method for implementing an action on or associated with a wireless communication network.

Although the present invention will be described with particular reference to an action comprising a handover or handoff (henceforth "handover") decision in a multi-cell wireless network, it will be appreciated that the invention may be used in respect of other telecommunication systems and networks and to implement actions other than, or additional to, handover decision making. Such other additional or alternative actions may include, for example, determining and providing notification of a location or position in an indoor environment, or operating a device.

BACKGROUND ART

Each document, reference, patent application, or patent cited in this text is expressly incorporated herein in its entirety by reference, which means that it should be read and considered by the reader as part of this text. That the document, reference, patent application, or patent cited in this text is not repeated in this text is merely for reasons of conciseness.

The following discussion of the background to the invention is intended to facilitate an understanding of the present invention only. It should be appreciated that the discussion is not an acknowledgement or admission that any of the material referred to was published, known or part of the common general knowledge of the person skilled in the art in any jurisdiction as at the priority date of the invention.

In a multi-cell wireless network, there are multiple network access points, which may be fixed stations, with which devices, such as mobile devices or mobile stations, may establish a connection, in order to access the wireless network. For example, the wireless communication technology used may be Wi-Fi. The mobile device may establish a connection with a particular access point to access the wireless network. However, as the mobile device moves relative to the serving access point, the connection with the serving access point may be lost or dropped due to, for example, insufficient signal strength to support the connection. Therefore, in such a wireless network, there exists a handover procedure for triggering the mobile device to establish a new connection with a target access point providing better signal strength when the connection with the serving access point becomes unsatisfactory or less desirable in an attempt to maintain continuous communication with the wireless network.

Typically, a handover decision is made primarily based on the Received Signal Strength Indication (RSSI) of a radio signal, as seen by the mobile device or the access point, to determine when a handover should be triggered and the target access point the mobile device should be handed over to. For example, in G, P. Pollini, "Trends in Handover Design", IEEE Communications Magazine, Vol. 34, pp. 82-90, March 1996, there were described various algorithms for deriving handover trigger conditions for a mobile device to change access points based on the RSSI determined by the mobile device and/or the network. For instance, a handover is triggered when the RSSI of a target access point is greater than the combined sum of the RSSI of the serving access point and a fixed handover margin.

In other related methods, a handover decision is alternatively made primarily based on the channel packet loss (Packet Loss) (i.e., the percentage of packets that are lost over a radio channel) or bit error rates (BER). In general, these methods characterise the quality of the communications channel in a scalar fashion and are reactive or lagging indicators.

In the above-described methods, the handover decision is ultimately made using a single scalar value (e.g., RSSI). However, the single scalar value alone is not always a reliable indicator to use in a radio environment when making handover decisions since it is subject to influences such as "radio fades" and multi-path reflections that together can provide false readings. For example, multipath fading characteristics are described in T. A. Wysocki and H. J. Zepernick, "Characterization of the indoor radio propagation channel at 2.4 GHz", Journal of Telecommunications and Information Technology, No. 3-4, vol. 1, pp. 8490, 2000.

For instance, temporary poor signal strength may be detected at locations where there would normally be acceptable signal strength. These temporal variations are known as dips or "fades" in radio communications, which are usually transient in nature. As a result, when only a single scalar valve such as RSSI is relied upon, a handover decision may be unnecessarily triggered based on such temporary poor signal strength for example. For example, the inherent variability arising from using RSSI to make handover decision is discussed in R. Narasimhan and D. C. Cox, "A Handoff Algorithm for Wireless Systems Using Pattern Recognition", in Proc. IEEE International Symp. on Personal, Indoor and Mobile Radio Commun. (PIMRC'98), pp. 335-339, September 1998.

RSSI methods tend to be reactive and conservative rather than predictive. This lack of predictive capability occurs at least in part because it is difficult to determine from the current RSSI what the RSSI will be a few seconds into the future for a mobile device that is in motion. For example, for RSSI based handover, RSSI from a candidate access point must be greater than current RSSI plus a safety margin. Consequently, handover decisions lag behind a moving user, resulting in a dropped or lost call if the user moves the mobile device away from the current access point too quickly.

Therefore, in the above-described methods, some handover decisions are suboptimal which may result in undesirable lost or dropped calls.

U.S. Pat. No. 7,536,186 discloses the use of speed and/or displacement information derived from an accelerometer or a Global Positioning System (GPS) chipset of a mobile device only for the purpose of determining whether to switch the mobile device's call connection from a wireless local area network (WLAN) coverage to a wide area network (WAN) coverage. In particular, if the speed and/or displacement information exceeds a predetermined threshold, then the mobile device's call connection with the WLAN coverage is switched to the WAN coverage. This is to increase the battery life of the device by making the mobile device run the hardware and software for only one of the WAN and WLAN systems at a time, instead of both simultaneously.

However, in U.S. Pat. No. 7,536,186, it is understood that the handover decision within a multi-cell network (such as within the WLAN network) is still made primarily based on RSSI. Therefore, U.S. Pat. No. 7,536,186 also suffers similar problems as discussed above when a handover decision is made primarily based on a single scalar value such as RSSI.

It is against this background that the present invention has been developed.

SUMMARY OF INVENTION

The present invention seeks to overcome to at least some extent, or at least ameliorate, one or more of the deficiencies of prior art for handover determination, or to provide the consumer with a useful or commercial choice.

Other advantages of the present invention will become apparent from the following description, taken in connection with the accompanying drawings, wherein, by way of illustration and example only, preferred embodiments of the present invention are disclosed.

According to a first broad aspect of the present invention, there is provided a system for implementing an action on or associated with a wireless communication network, the system comprising:

a wireless communication enabled device operable to communicate with the wireless communication network;

at least one sensor for sensing and gathering sensor data relating to a state of the wireless communication enabled device or a state of the environment surrounding the wireless communication enabled device, wherein the wireless communication enabled device comprises a plurality of estimation means for receiving the sensor data and generating a plurality of estimates of the state of the wireless communication enabled device based on the sensor data, and a decision means for determining whether to implement the action based on the plurality of estimates of the state of the wireless communication enabled device.

Preferably, the sensor comprises part of a set of sensors. The set of sensors may comprise a sensor system.

Preferably, the decision means determines whether to implement the action based on a projected state of the wireless communication enabled device, wherein the projected state is determined based on the plurality of estimates of the state of the wireless communication enabled device.

Preferably, the state of the wireless communication enabled device comprises at least one of a position, a velocity and a speed of the wireless communication enabled device.

Preferably, the state of the environment surrounding the wireless communication enabled device comprises at least one and more preferably a plurality of signal strengths sensed.

Preferably, the state of the environment surrounding the wireless communication enabled device comprises data, information, details or knowledge of or associated with the wireless communication network. This may include a network topology, including physical and logical topology, and a network performance. In such an embodiment, the sensing may comprise receiving or accessing a store of such data, information, details or knowledge.

Preferably, the wireless communication enabled device further comprises the at least one sensor.

Preferably, the wireless communication enabled device further comprises an acquisition means for receiving the sensor data and outputting the sensor data to the plurality of estimation means.

Preferably, the wireless communication network comprises a plurality of access points, wherein each of the access points provides network coverage in a vicinity thereof.

Preferably, the wireless communication enabled device is operable to establish a connection with one of the plurality of access points to communicate with the wireless communication network.

Preferably, the sensor comprises at least one of a signal strength sensor, an acceleration sensor, an orientation sensor, a direction sensor and a position sensor.

Preferably, the signal strength sensor is operable to measure the signal strength at the wireless communication enabled device associated with one or more of the plurality of access points and generate a signal strength indicator in the form of a Received Signal Strength Indication (RSSI) based on the signal strength measured with respect to each of the one or more of the plurality of access points.

Preferably, the acceleration sensor is operable to measure an acceleration of the wireless communication enabled device and to generate an acceleration data based on the acceleration measured.

Preferably, the acceleration sensor is an accelerometer.

Preferably, the accelerometer is operable to sense accelerations in three orthogonal axes.

Preferably, the orientation sensor is operable to measure a rate of change of the orientation of the wireless communication enabled device and to generate an orientation data based on the rate of change of the orientation measured.

Preferably, the orientation sensor is a gyroscope.

Preferably, the gyroscope is operable to sense rotations in three orthogonal axes.

Preferably, the direction sensor is operable to determine a direction relative to the Earth's magnetic poles.

Preferably, the direction sensor is an electronic compass.

Preferably, the electronic compass comprises a magnetometer operable to sense the Earth's magnetic field in three orthogonal axes.

Preferably, the position sensor is operable to determine a position of the wireless communication enabled device.

Preferably, the position sensor is a Global Positioning System (GPS).

Embodiments of the invention may comprise any number or combination of estimation means. Preferably, the plurality of estimation means comprises a first estimation means for generating a first estimate of the state of the wireless communication enabled device, a second estimation means for generating a second estimate of the state of the wireless communication enabled device, and a third estimation means for generating a third estimate of the state of the wireless communication enabled device.

Preferably, the plurality of estimation means comprises a fourth estimation means for generating a fourth estimate of the state of the wireless communication enabled device, and a fifth estimation means for generating a fifth estimate of the state of the wireless communication enabled device.

Preferably, the first estimate comprises a velocity estimate and a position estimate of the wireless communication enabled device determined based on the acceleration data received from the acceleration sensor and the orientation data received from the orientation sensor.

Preferably, the velocity estimate is determined by integrating the acceleration data and the position estimate is determined by integrating the velocity estimate based on a dead reckoning method.

Preferably, the second estimate comprises a speed estimate of the wireless communication enabled device determined based on the acceleration data received from the acceleration sensor.

Preferably, the speed estimate is determined based on a filtered acceleration data.

Preferably, the filtered acceleration data is obtained by filtering the acceleration data with a Fast Fourier Transform (FFT) filter to derive a power spectrum.

Preferably, the third estimate comprises a position estimate of the wireless communication enabled device determined based on the RSSI received from the signal strength sensor.

Preferably, the position estimate is determined via a wireless triangulation method using a plurality of the RSSI received at the wireless communication enabled device.

Preferably, the wireless triangulation method is based on a constrained Torgerson-SMACOF algorithm.

Preferably, the fourth estimate comprises a position estimate of the wireless communication enabled device determined based on a representation of RSSI received by one or more devices at different times and locations within the environment of or surrounding the wireless enabled communication device.

Preferably, the representation comprises a map.

Preferably, the representation of RSSI comprises numerical values defining a feed-forward, multi-layer perceptron neural network, or a radial basis function network.

Preferably, the fifth estimate comprises a position estimate of the wireless communication enabled device determined based on a representation of common paths traversed within the environment of or surrounding the wireless enabled communication device.

Preferably, the representation comprises a map.

Preferably, the representation of common paths comprises numerical values defining a feed-forward, multi-layer perceptron neural network, or a radial basis function network.

Preferably, the plurality of estimation means further comprises adjustment means for generating a final estimate of the state of the wireless communication enabled device based on two or more of the plurality of estimates:

Preferably, the final estimate comprises a position estimate and a velocity estimate of the wireless communication enabled device determined based on the plurality of estimates.

Preferably, the adjustment means comprises a correction means for correcting the position estimate of the first estimate based on the position measurement error estimate and outputting the corrected position estimate as the final position estimate.

Preferably, the adjustment means comprises a filter means, wherein the filter means is operable to receive and filter at least two of the state estimates prior to being outputted to the correction means.

Preferably, the filter means comprises a recursive Bayes filter.

Where probability density functions of the one or more estimates approximate a normal distribution, the recursive Bayes filter preferably comprises a Kalman filter.

Where probability density functions of the one or more estimates do not approximate the normal distribution, the recursive Bayes filter used is preferably a particle filter.

Preferably, the adjustment means generates a final estimate of the state of the wireless communication enabled device based on the first estimate, the second estimate and the third estimate received from the first estimation means, the second estimation means and the third estimation means, respectively.

Preferably, the adjustment means comprises an error determination means for determining at least one of a position measurement error estimate and a speed measurement error estimate.

Preferably, the position measurement error estimate is determined based on a difference between the position estimate of the first estimate and the position estimate of the remaining estimates.

Preferably, the speed measurement error estimate is determined based on a difference between a magnitude of the velocity estimate of the first estimate and the speed estimate of the remaining estimates.

Preferably, the final estimate comprises a position estimate and a velocity estimate of the wireless communication enabled device determined based on the first estimate, and the remaining estimates.

Preferably, the adjustment means comprises a correction means for correcting the velocity estimate of the first estimate based on the speed measurement error estimate and outputting the corrected velocity estimate as the final velocity estimate.

Preferably, the error determination means further comprises a filter means, wherein the filter means receives and filters at least one of the position measurement error estimate and the speed measurement error estimate prior to being outputted to the adjustment means.

Preferably, the filter comprises a recursive Bayes filter.

Where probability density functions of the estimates approximate a normal distribution, the recursive Bayes filter preferably comprises a Kalman filter.

Where probability density functions of the one or more estimates do not approximate the normal distribution, the recursive Bayes filter used is preferably a particle filter.

In an embodiment of the invention, one or more of the, and preferably the first, plurality of estimation means is caused to reset when at least one of the position and velocity measurement error estimates exceed a predetermined threshold.

Preferably, the action comprises making a handover of the connection the wireless communication enabled device has established with a serving access point of the plurality of access points to a target access point of the plurality of access points. In embodiments of the invention, the action may comprise additional or alternative actions including determining and providing notification of a location in an indoor environment and/or operating a device.

Preferably, the decision means determines to implement the action using an algorithm that determines whether a target access point is more favourable than the serving access point, given at least a projected location, speed and direction of travel of the wireless communication enabled device as parameters.

Preferably, the decision means determines to implement the action if the projected state of the wireless communication enabled device includes a position which is closer to the target access point than the serving access point.

Preferably, the position of the projected state is determined by extrapolating the final position estimate in a linear manner using the final velocity estimate.

Preferably, the wireless communication enabled device further comprises a processor for executing instructions, and wherein one or more of the plurality of estimation means and the decision means are implemented as sets of instructions stored in a computer-readable storage medium accessible by the processor.

According to a second broad aspect of the present invention, there is provided a method for implementing an action on or associated with a wireless communication network, the method comprising:

sensing and gathering data relating to a state of the wireless communication network or a state of the environment surrounding the wireless communication enabled device;

generating a plurality of estimates of the state of the wireless communication enabled device based on the data;

determining whether to implement the action based on the plurality of estimates of the state of the wireless communication enabled device.

Preferably, said determining comprises determining whether to implement the action based on a projected state of the wireless communication enabled device, wherein the projected state is determined based on the plurality of estimates of the state of the wireless communication enabled device.

Preferably, the state of the wireless communication enabled device comprises at least one of a position, a velocity and a speed of the wireless communication enabled device.

Preferably, the state of the environment surrounding the wireless communication enabled device comprises at least one and more preferably a plurality of signal strengths sensed.

Preferably, the state of the environment surrounding the wireless communication enabled device comprises data, information, details or knowledge of or associated with the wireless communication network. This may include a network topology, including physical and logical topology, and a network performance. In such an embodiment, the sensing and gathering may comprise receiving or accessing a store of such data, information, details or knowledge.

Preferably, the data comprises at least one of a signal strength data, an acceleration data, an orientation data, a direction data and a position data.

Preferably, the signal strength data comprises one or more Received Signal Strength Indication (RSSI) measured at the wireless communication enabled device with respect to one or more of a plurality of access points.

Preferably, the RSSI is generated by a radio signal strength sensor.

Preferably, the acceleration data is determined based on an acceleration of the wireless communication enabled device.

Preferably, the acceleration data is generated by an accelerometer.

Preferably, the accelerometer is operable to sense accelerations in three orthogonal axes.

Preferably, the orientation data is determined based on a rate of change of the orientation of the wireless communication enabled device.

Preferably, the orientation data is generated by a gyroscope.

Preferably, the gyroscope is operable to sense rotations in three orthogonal axes.

Preferably, the direction data is determined based, on a direction relative to the Earth's magnetic poles.

Preferably, the direction data is generated by an electronic compass.

Preferably, the electronic compass comprises a magnetometer operable to sense the Earth's magnetic field in three orthogonal axes.

Preferably, the position data is determined based on a position of the wireless communication enabled device.

Preferably, the position data is generated by a Global Positioning System (GPS).

Any number or combination of estimates may be generated in embodiments of the invention. Preferably, said generating a plurality of estimates comprises generating a first estimate of the state of the wireless communication enabled device, generating a second estimate of the state of the wireless communication enabled device, and generating a third estimate of the wireless communication enabled device.

Preferably, said generating a plurality of estimates comprises generating a fourth estimate of the state of the wireless communication enabled device, and generating a fifth estimate of the state of the wireless communication enabled device.

Preferably, the first estimate comprises a velocity estimate and a position estimate of the wireless communication enabled device determined based on the acceleration data and the orientation data.

Preferably, the velocity estimate is determined by integrating the acceleration data and the position estimate is determined by integrating the velocity estimate based on a dead reckoning method.

Preferably, the second estimate comprises a speed estimate of the wireless communication enabled device determined based on the acceleration data.

Preferably, the speed estimate is determined based on a filtered acceleration data.

Preferably, the filtered acceleration data is obtained by filtering the acceleration data with a Fast Fourier Transform (FFT) filter to derive a power spectrum.

Preferably, the third estimate comprises a position estimate of the wireless communication enabled device determined based on the RSSI.

Preferably, the position estimate is determined via a wireless triangulation method using a plurality of the RSSI received.

Preferably, the wireless triangulation method is based on a constrained Torgerson-SMACOF algorithm.

Preferably, the fourth estimate comprises a position estimate of the wireless communication enabled device determined based on a representation of RSSI received by one or more devices at different times and locations within the environment of or surrounding the wireless enabled communication device.

Preferably, the representation comprises a map.

Preferably, the representation of RSSI comprises numerical values defining a feed-forward, multi-layer perceptron neural network, or a radial basis function network.

Preferably, the fifth estimate comprises a position estimate of the wireless communication enabled device determined based on a representation of common paths traversed within the environment of or surrounding the wireless enabled communication device.

Preferably, the representation comprises a map.

Preferably, the representation of common paths comprises numerical values defining a feed-forward, multi-layer perceptron neural network, or a radial basis function network.

Preferably, said generating a plurality of estimates further comprises determining a final estimate of the state of the wireless communication enabled device based on two or more of the plurality of estimates.

Preferably, the final estimate comprises a position estimate and a velocity estimate of the wireless communication enabled device determined based on the plurality of estimates.

Preferably, said generating of plurality of estimates further comprises correcting the position estimate of the first estimate based on the position measurement error estimate and outputting the corrected position estimate as the final position estimate.

Preferably, said generating a plurality of estimates further comprises filtering at least two of the state estimates prior to said correcting.

Preferably, said filtering comprises using a recursive Bayes filter.

Where probability density functions of the one or more estimates approximate a normal distribution, the recursive Bayes filter used preferably comprises a Kalman filter.

Where probability density functions of the one or more estimates do not approximate the normal distribution, the recursive Bayes filter used is preferably a particle filter.

Preferably, said generating a plurality of estimates further comprises determining a final estimate of the state of the wireless communication enabled device based on the first estimate, the second estimate and the third estimate.

Preferably, said generating a plurality of estimates further comprising determining at least one of a position measurement error estimate and a speed measurement error estimate.

Preferably, the position measurement error estimate is determined based on a difference between the position estimate of the first estimate and the position estimate of the remaining estimates.

Preferably, the speed measurement error estimate is determined based on a difference between a magnitude of the velocity estimate of the first estimate and the speed estimate of the remaining estimates.

Preferably, the final estimate comprises a position estimate and a velocity estimate of the wireless communication enabled device determined based on the first estimate, and the remaining estimates.

Preferably, said generating a plurality of estimates further comprises correcting the position estimate of the first estimate based on the position measurement error estimate and outputting the corrected position estimate as the final position estimate.

Preferably, said generating a plurality of estimates further comprises correcting the velocity estimate of the first estimate based on the speed measurement error estimate and outputting the corrected velocity estimate as the final velocity estimate.

Preferably, said generating a plurality of estimates further comprises filtering at least one of the position and speed measurement error estimates prior to said correcting.

Preferably, said filtering comprises filtering using a recursive Bayes filter.

Where probability density functions of the one or more estimates approximate a normal distribution, the recursive Bayes filter used preferably comprises a Kalman filter.

Where probability density functions of the one or more estimates do not approximate the normal distribution, the recursive Bayes filter used is preferably a particle filter.

Preferably, one or more of the generated plurality of estimates, of the state of the wireless communication enabled device is reset when at least one of the position and velocity measurement error estimates exceed a predetermined threshold.

Preferably, the action comprises making a handover of the connection the wireless communication enabled device has established with a serving access point of the plurality of access points to a target access point of the plurality of the access points. In embodiments of the invention, the action may comprise additional or alternative actions including determining and providing notification of a location in an indoor environment and/or operating a device.

Preferably, said determining comprises using an algorithm that determines whether a target access point is more favourable than the serving access point, given at least a projected location, speed and direction of travel of the wireless communication enabled device as parameters.

Preferably, the action is implemented if the projected state of the wireless communication enabled device includes a position which is closer to the target access point than the serving access point.

Preferably, the position of the projected state is determined by extrapolating the final position estimate in a linear manner using the final velocity estimate.

According to a third broad aspect of the present invention, there is provided a system for correcting an estimate of a state of a wireless communication enabled device estimated by a dead reckoning method, the system comprising:
 a first estimation means for producing a first estimate of the state of the wireless communication enabled device, and
 an adjustment means for correcting said estimate based on one or more other estimates of the state of the wireless communication enabled device.

Preferably, the system further comprises a second estimation means for generating a second estimate of the state of the wireless communication enabled device, and
 wherein the adjustment means corrects said estimate based on the first estimate and the second estimate.

Preferably, the state of the wireless communication enabled device comprises at least one of a position, a speed and a velocity of the wireless communication enabled device.

Preferably, the first estimation means estimates the position or the speed of the wireless communication enabled device.

Preferably, the second estimation means estimates the other of the position or the speed of the wireless communication enabled device.

Preferably, the position is estimated based on a signal strength sensed at the wireless communication enabled device.

Preferably, the signal strength is a Received Signal Strength Indication (RSSI) and the position is estimated via a wireless triangulation using a plurality of RSSI received at the wireless communication enabled device.

Preferably, the wireless triangulation method is based on a constrained Torgerson-SMACOF algorithm.

Preferably, the speed is estimated based on a filtered acceleration data, and wherein the acceleration data is a measure of an acceleration of the wireless communication enabled device.

Preferably, the filtered acceleration data is obtained by filtering the acceleration data using a Fast Fourier Transform (FFT) filter.

Preferably, the adjustment means comprises an error determination means for generating a first measurement error estimate, wherein the first measurement error estimate is generated based on a difference between said estimate and the first estimate.

Preferably, the error determination means further generates a second measurement error estimate, wherein the second measurement error estimate is generated based on a difference between said estimate and the second estimate.

Preferably, the adjustment means further comprises a filter for filtering at least one of the first and the other error estimates.

Preferably, the filter comprises a recursive Bayes filter.

Where probability density functions of the first and other estimates approximate a normal distribution, the recursive Bayes filter preferably comprises a Kalman filter.

Where probability density functions of the first and other estimates do not approximate the normal distribution, the recursive Bayes filter used is preferably a particle filter.

Preferably, the adjustment means further comprises a correction means for correcting said estimate using the filtered first and second measurement error estimates.

Preferably, the adjustment means resets the dead reckoning method when at least one of the first and second measurement error estimates exceeds a predetermined threshold.

According to a fourth broad aspect of the present invention, there is provided a method for correcting an estimate of a state of a wireless communication enabled device estimated by a dead reckoning method, the method comprising:
  generating a first estimate of the state of the wireless communication enabled device,
  correcting said estimate based on one or more, others estimates of the state of the wireless communication enabled device.

Preferably, the method further comprises generating a second estimate of the state of the wireless communication enabled device, and
  wherein said correcting corrects said estimate based on the first estimate and the second estimate.

Preferably, the state of the wireless communication enabled device comprises at least one of a position, a speed and a velocity of the wireless communication enabled device.

Preferably, the first estimate comprises the position or the speed of the wireless communication enabled device.

Preferably, the second estimate comprises the other of the position or the speed of the wireless communication enabled device.

Preferably, the position is estimated based on a signal strength sensed at the wireless communication enabled device.

Preferably, the signal strength is a Received Signal Strength Indication (RSSI) and the position is estimated via a wireless triangulation using a plurality of RSSI received at the wireless communication enabled device.

Preferably, the wireless triangulation method is based on a constrained Torgerson-SMACOF algorithm Preferably, the speed is estimated based on a filtered acceleration data, and wherein the acceleration data is a measure of an acceleration of the wireless communication enabled device.

Preferably, the filtered acceleration data is obtained by filtering the acceleration data using a Fast Fourier Transform (FFT) filter.

Preferably, the method further comprises generating a first measurement error estimate, wherein the first measurement error estimate is generated based on a difference between said estimate and the first estimate.

Preferably, the method further comprises generating a second measurement error estimate, wherein the second measurement error estimate is generated based on a difference between said estimate and the second estimate.

Preferably, the method further comprises filtering at least one of the first and the other error estimates.

Preferably, the filter comprises a recursive Bayes filter.

Where probability density functions of the first and other estimates approximate a normal distribution, the recursive Bayes filter preferably comprises a Kalman filter.

Where probability density functions of the first and other estimates do not approximate the normal distribution, the recursive Bayes filter used is preferably a particle filter.

Preferably, said correcting corrects said estimate using the filtered first and second measurement error estimates.

Preferably, the method further comprises resetting the dead reckoning method when at least one of the first and second measurement error estimates exceeds a predetermined threshold.

According to a fifth broad aspect of the present invention, there is provided a system for implementing an action on or associated with a wireless communication network, the system comprising:
  a wireless communication enabled device operable to communicate with the wireless communication network;
    wherein the wireless communication enabled device comprises a plurality of estimation means for receiving data and generating a plurality of estimates of a state of the wireless communication enabled device based on the received data and
  a decision means for determining whether to implement the action based on the plurality of estimates of the state of the wireless communication enabled device.

Preferably, the data relates to a state of the wireless communication enabled device or a state of the environment surrounding the wireless communication enabled device.

The data may be provided as an input.

The input may come from at least one sensor for sensing and gathering the data. Additionally, or alternatively, the input may come from a store of information, details or knowledge of or associated with the wireless communication network. This may include a network topology, including physical and logical topology, and a network performance.

Preferably, the estimation means comprises a plurality of estimation means for generating a plurality of estimates of the state of the wireless communication enabled device. Preferably, each of the estimates is derived from a different source. Estimates and corresponding sources from which they are derived from or based on include: a position estimate and a velocity estimate from acceleration data and orientation data; a position estimate from neural network mapping of RSSI data; a position estimate from RSSI using a SMACOF triangulation; a speed estimate from acceleration data transformed to provide step rate; a position estimate from a stored map or representation of common paths; a position estimate and a velocity estimate from GPS data.

In embodiments of the invention, each of the sources is used to provide an estimate that can be combined with an estimate of variance to produce a corresponding probability density function. In such a case, the system may further comprise filter means operable to derive an updated state by filtering two or more of the probability density functions.

According to a sixth broad aspect of the present invention, there is provided a method for implementing an action on or associated with a wireless communication network, the method comprising:
  receiving data and generating a plurality of estimates of a state of a wireless communication enabled device based on the received data, and determining whether to implement the action based on the plurality of estimates of the state of the wireless communication enabled device.

Preferably, the data relates to a state of the wireless communication enabled device or a state of the environment surrounding the wireless communication enabled device.

The data is preferably provided as an input.

The method preferably comprises sensing and gathering the data. Additionally, or alternatively, the input may come from a store of information, details or knowledge of or associated with the wireless communication network. This may include a network topology, including physical and logical topology, and a network performance.

Preferably, said estimating comprises generating a plurality of estimates of the state of the wireless communication enabled device. Preferably, each of the estimates is derived from a different source. Estimates and corresponding sources from which they are derived from or based on include: a position estimate and a velocity estimate from acceleration data and orientation data; a position estimate from neural network mapping of RSSI data; a position estimate from RSSI using a SMACOF triangulation; a speed estimate from acceleration data transformed to provide step rate; a position estimate from a stored map or representation of common paths; a position estimate and a velocity estimate from GPS data.

In embodiments of the invention, each of the sources is used to provide an estimate that can be combined with an estimate of variance to produce a corresponding probability density function. In such a case, the method may further comprise filtering two or more of the probability density functions to derive an updated state.

According to a seventh broad aspect of the present invention, there is provided a system for estimating a state of a wireless communication enabled device, the system comprising:
an estimation means for receiving data and estimating the state of the wireless communication enabled device based on the received data.

According to an eighth broad aspect of the present invention, there is provided a method for estimating a state of a wireless communication enabled device, the method comprising:
receiving data and estimating the state of the wireless communication enabled device based on the received data.

According to a ninth broad aspect of the present invention, there is provided a computer-readable storage medium on which is stored instructions that, when executed by a computing means, causes the computing means to carry out the method according to the second, fourth, sixth, or eighth broad aspects of the present invention as hereinbefore described.

According to a tenth broad aspect of the present invention, there is provided a computing means programmed to carry out the method according to the second, fourth, sixth or eighth broad aspects of the present invention as hereinbefore described.

According to a eleventh broad aspect of the present invention, there is provided a data signal including at least one instructions being capable of being received and interpreted by a computing system, wherein the instruction implements the method according to the second, fourth, sixth, or eighth broad aspects of the present invention as hereinbefore described.

According to a twelfth broad aspect of the present invention, there is provided a wireless communication enabled device for use with any of the broad aspects of the present invention as hereinbefore described.

BRIEF DESCRIPTION OF THE DRAWINGS

In order that the invention may be more fully understood and put into practice, preferred embodiments thereof will now be described with reference to the accompanying drawings, in which.

DESCRIPTION OF EMBODIMENTS

Although the present invention will be described with particular reference to an action comprising a handover decision in a multi-cell wireless network, it will be appreciated that the invention may be used in respect of other telecommunication systems and networks and to implement actions other than, or additional to, handover decision making. Such other additional or alternative actions may include, for example, determining and providing notification of a location or position in an indoor environment such as a museum, and/or operating a device.

Figure 1:
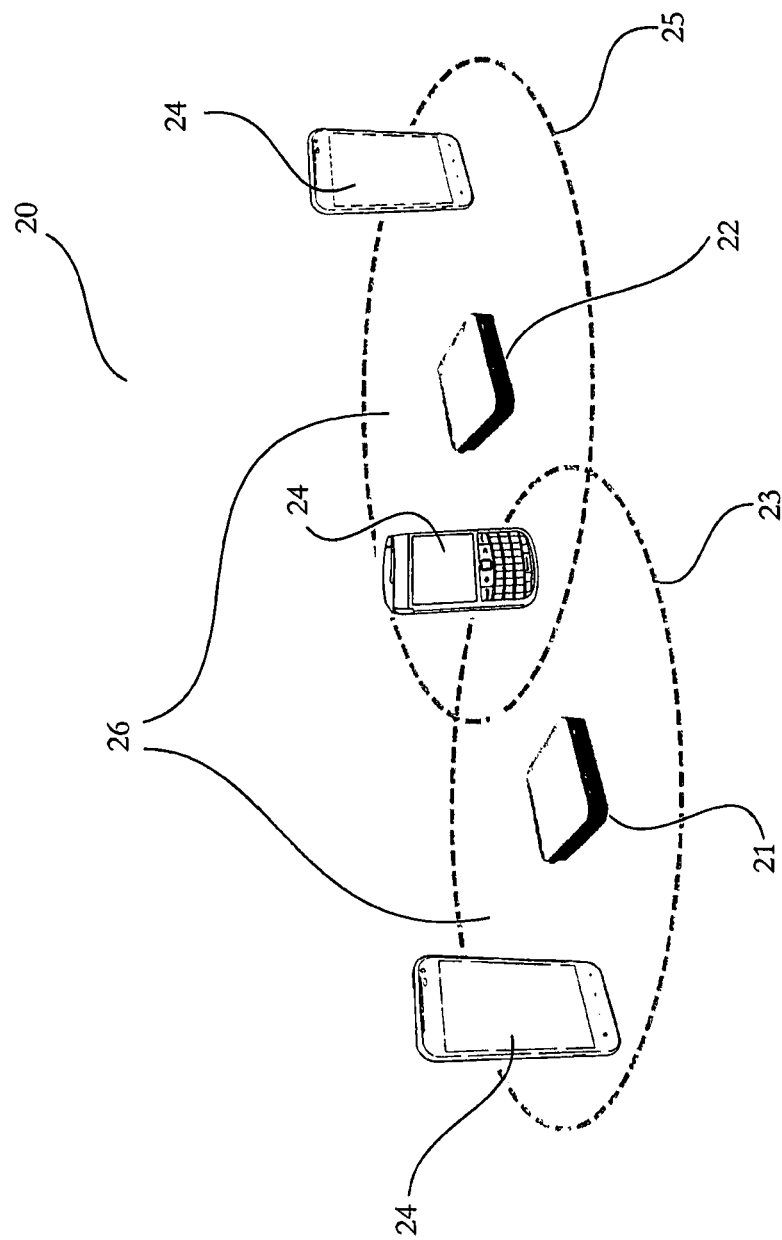
FIG. 1 depicts a multi-cell wireless network according to an embodiment of the present invention.

A first embodiment of a system 10 in accordance with an aspect of the present invention is intended to be used in a communication system 20, as depicted in FIG. 1. In the embodiment described the communication system 20 uses wireless technology and comprises a number of access points 21, 22 which are base stations (or fixed stations) for a multi-cell wireless network 26. The access points 21, 22 are operable and configured to transmit and receive radio signals for communication with wireless communication enabled devices 24, such as computers and mobile phones. The wireless communication enabled devices 24 are operable and can establish a connection with one of the access points 21, 22 as a gateway to gain access to a wider network. For example, the wider network may be the World Wide Web (WWW) or the Public Switched Telephone Network (PSTN). The access points 21, 22 may be interconnected using wired or wireless technology (such as wired or wireless Ethernet) (not shown).

The communication system 20 provides the multi-cell wireless network 26 to which the wireless communication enabled devices 24 can establish a connection. Each access point 21, 22 is operable to provide a characteristic amount of individual or corresponding network coverage (or cell) 23, 25 in the vicinity thereof as illustrated in FIG. 1 for the multi-cell wireless network 26. It will be apparent to the person skilled in the art that the network coverage provided by each access point 21, 22 will depend on the type of access point. For example, an 802.11n access point is estimated to be capable of providing an indoor range of about 30 m to 50 m.

In order for the wireless communication enabled device 24 to communicate with the multi-cell wireless network 26, the wireless communication enabled device 24 needs to be located within one of the cells 23, 25 in order to establish a connection having sufficient signal strength with an access point 21, 22 associated with the cell 23, 25.

In FIG. 1, by way of example and not limitation, two access points 21, 22 are shown forming the multi-cell wireless network 26. It will be apparent to the person skilled in the art that the multi-cell wireless network 26 may comprise as many access points as required depending on various factors such as the area of coverage required.

In the embodiment described, the wireless communication enabled device 24 is preferably a mobile or portable computing device, which can be referred to as a mobile station. For example, the mobile station 24 can be a device such as a personal portable computer (e.g., a laptop computer, a notebook computer or a tablet computer such as that marketed under the trade mark iPad® or iPod® Touch by Apple Inc.) or a mobile communication device (e.g., a smartphone such as that marketed under the trade mark iPhone® by Apple Inc.).

In the example shown in FIG. 1, as the mobile station 24 moves through the multi-cell wireless network 26 from the cell 23 on the left to the cell 25 on the right of FIG. 1, the connection of the mobile station 24 with the serving access point 21 on the left needs to be handed over to the target access point 22 on the right in order to maintain the communication of the mobile station 24 with the multi-cell wireless network 26.

As discussed in the background of this invention, typically, a handover decision is made primarily based on a single scalar value such as the Received Signal Strength Indication (RSSI). However, making a handover decision based on such existing methods is not always reliable, which results in undesirable interruption in connection, or even worse, a dropped or lost connection altogether.

The system 10 is operable to implement an action on or in respect of the communication system 20. In the embodiment described, the action comprises making a handover decision in the multi-cell wireless network 26.

Figure 2:
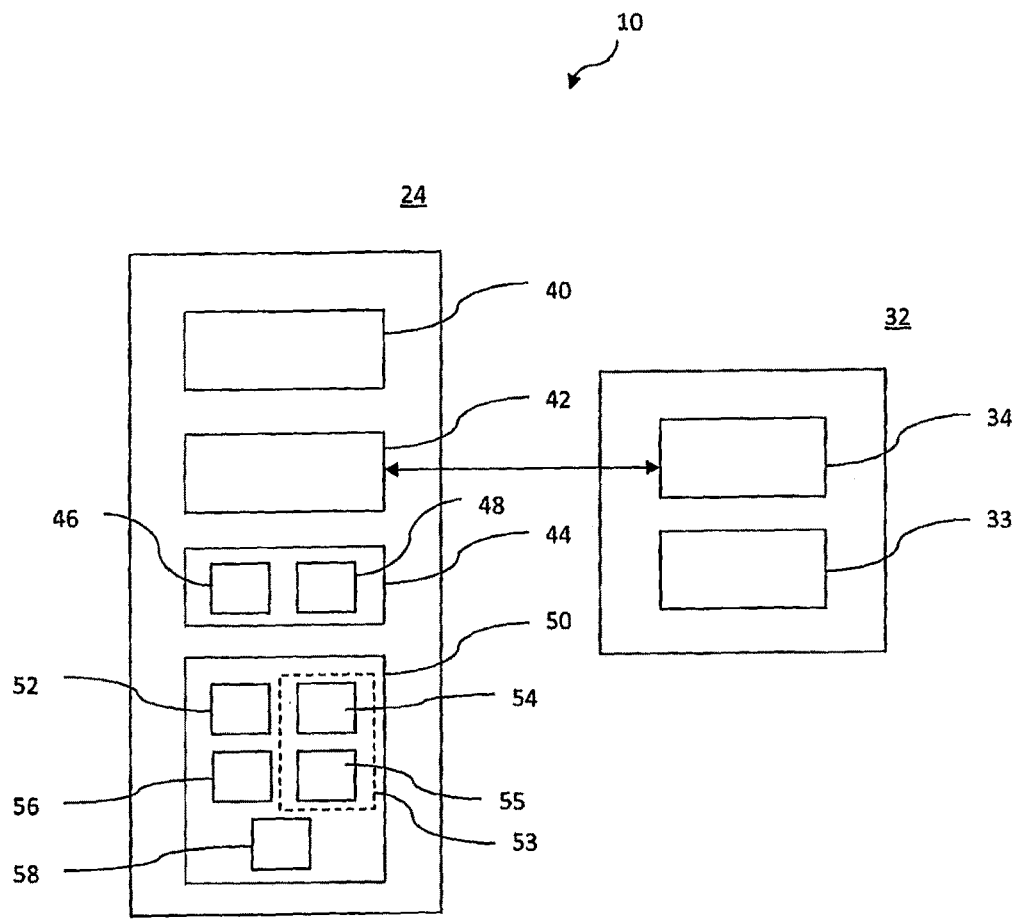
FIG. 2 depicts a system for implementing an action on or associated with a wireless communication network according to the embodiment of the present invention.

The system 10 improves the accuracy of handover decisions in the multi-cell wireless network 26, thus enhancing the reliability and quality of the communication of the mobile station 24 with the multi-cell wireless network 26. By way of example and without limitation, the system 10 is depicted in FIG. 2. The system 10 comprises the mobile station 24, which is operable to make a handover decision in the multi-cell wireless network 26. Preferably, the system 10 also comprises a server 32 that is configured to transmit or communicate data or information to the mobile station 24 relevant to the action (i.e. making the handover decision in the embodiment described). However, it will be apparent to the person skilled in the art that the server 32, although preferable, is not essential and the information stored in the server 32, rather than being stored remotely, may instead be stored in the mobile station 24.

The mobile station 24 comprises processing means in the form of a processor 40 operable for processing/executing instructions and managing the flow of data and information through the mobile station 24. For example, the processor 40 can be any custom made or commercially available processor, a central processing unit (CPU), a data signal processor (DSP) or an auxiliary processor among several processors associated with the mobile station 24. The processor 40 may be a semiconductor based microprocessor (in the form of a microchip) or a macroprocessor, for example.

The mobile station 24 also comprises a network interface 42 configured to provide data access and/or voice access to the mobile station 24. For example, the network interface 42 may include a transceiver having an antenna for receiving and transmitting wireless signals to enable wireless communication with the access points 21, 22 of the wireless communication system 20. For example, the wireless communication protocols and technologies can be Wi-Fi, WiMAX, Bluetooth®, etc. In the embodiment described, the network interface 42 is able to communicate with the network interface 34 of the server for receiving and transmitting data.

The mobile station 24 further comprises a storage device or medium 44 which can include any one or combination of volatile memory elements (e.g., random access memory (RAM) such as dynamic random access memory (DRAM), static random access memory (SRAM)) and non-volatile memory elements (e.g., read only memory (ROM), erasable programmable read only memory (EPROM), electronically erasable programmable read only memory (EEPROM), programmable read only memory (PROM), tape, compact disc read only memory (CD-ROM), etc.). The storage medium 44 may incorporate electronic, magnetic, optical and/or other types of storage media. Furthermore, the storage medium 44 can have a distributed architecture, where various components are situated remote from one another, but can be accessed by the processor 40. For example, the ROM may store various instructions, programs, software, or applications to be executed by the processor 40 to control the operation of the mobile station 24 and the RAM may temporarily store variables or results of the operations.

Where the words "store", "hold" and "save" or similar words are used in the context of the present invention, they are to be understood as including reference to the retaining or holding of data or information both permanently and/or temporarily in a storage means, device or medium for later retrieval, and momentarily or instantaneously, for example as part of a processing operation being performed.

Additionally, where the terms "system" and "device" are used in the context of the present invention, they are to be understood as including reference to any group of functionally related or interacting, interrelated, interdependent or associated components or elements that may be located in proximity to, separate from, integrated with, or discrete from, each other.

Additionally, in embodiments of the invention, the word "determining" is understood to include receiving or accessing the relevant data or information.

The mobile station 24 also comprises a sensor or detector system or a set of sensors or detectors 50. Individual sensors within the set of sensors 50 are operable to monitor, sense and gather sensor data or information associated with or relating to characteristics, properties and parameters of components of the system 10, the environment, or elements or devices associated therewith or coupled thereto such as the communication system 20. For example, the set of sensors 50 is operable to sense and gather sensor data relating to a state of the mobile station 24 or a state of the environment surrounding the mobile station 24. The state of the mobile station 24 includes at least one of a position, a velocity and a speed of the mobile station 24. In the embodiment described, the set of sensors 50 include a signal strength sensor 52, an inertial sensor system 53 comprising an acceleration sensor 54 and an orientation sensor 55, a direction sensor 56 and a position sensor 58. For example, the signal strength sensor 52 may be operable and configured to measure signal strength at the mobile station 24 with respect to one or more access points 21, 22 and generate one or more signal strength indicators preferably in the form of RSSI. The acceleration sensor 54 may be an accelerometer for measuring an acceleration of the mobile station 24 and produce an acceleration data. The direction sensor may be operable to determine a direction relative to the Earth's magnetic poles and produce a direction data. For example, the direction sensor 56 may be an electronic compass. The position sensor 58 may be a Global Positioning System (GPS) for determining the position of the mobile station 24 and producing a position data. The orientation sensor 55 may be a gyroscope for measuring the rate of change of the orientation (i.e., angular rate) of the mobile station 24 and produce an orientation data.

The mobile station 24 comprising the above-described set of sensors 50 may be any one of those commercially available. For example, a smartphone such as that marketed under the trademark iPhone 4® by Apple Inc. Alternatively, the mobile station 24 may be made with or operably coupled with or to sensors of the above-described set of sensors 50.

In the embodiment described, the mobile station 24 has a suitable Operating System (OS) 46 installed in the storage medium 44. For example but without limitation, the OS may be iOS, SYMBIAN, RIM BLACKBERRY, WINDOWS MOBILE, LINUX, GOOGLE ANDROID or Web OS. The OS 46 is configured to control the overall operation of the mobile station 24 when executed by the processor 40. In addition, the mobile station 24 preferably has a program or application 48 installed in the storage medium 44 for controlling the mobile station 24 to perform an operation or a function when executed by the processor 40. However, it will be apparent to the person skilled in the art that the application 48 need not be installed in the storage medium 44 of the mobile station 24 and can instead be located in a storage medium remote from the mobile station 24 but can be accessed by the processor 40 of the mobile station 24 for execution.

The application 48, when implemented in software, may be a source program, executable program (object code), script or any other entity comprising a set of instructions to be performed. In the case of the mobile station 24 being an iPhone® smartphone, the application may be developed using application development tools, such as those provided by Apple Inc., well known in the art to create application(s) operable on iPhone® smartphones.

Alternatively, the application 48 may be implemented in hardware. In such a case, for example, the application 48 may be implemented with any one or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA) and the like.

Figure 3:
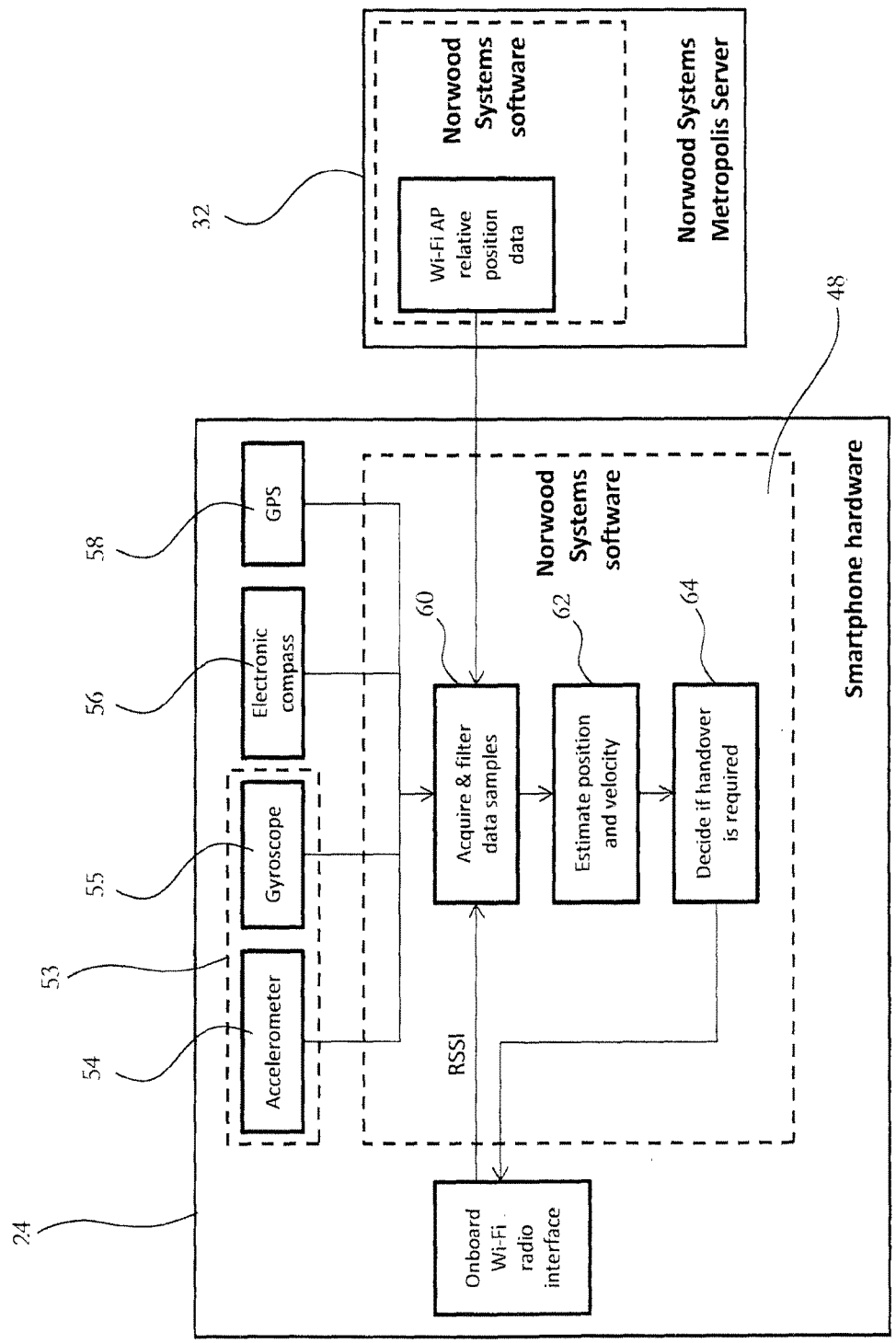
FIG. 3 depicts an exemplary architecture of the system according to the embodiment of the present invention.

In the embodiment described, the mobile station 24, under the control of the application 48, is operable to make a handover decision in the multi-cell wireless network 26. The application 48 can be functionally categorised into a plurality of modules or means including a data acquisition module or means 60, an estimation module or means 62 and a decision module or means 64 as shown in FIG. 3 by way of example and not limitation.

The data acquisition module 60 is operable to receive the sensor data from one or more of the set of sensors 50 as inputs for making a handover decision. The data acquisition module 60 is also configured to receive contextual data from the server 32. Preferably, the contextual data is received by the data acquisition module 60 using wireless communication technology such as Wi-Fi. The contextual data provides information relating to or associated with the wireless communication system 20, and includes information pertaining to the layout of the wireless communication system 20 such as the position of the access points 21, 22, the individual area of coverage 25 provided by each access point 21, 22, and so on.

In the embodiment described, the data acquisition module 60 is operable to receive the RSSI data from the RSSI sensor 52, the acceleration data from the acceleration sensor 54, the directional data from the direction sensor 56, the position data from the position sensor 58, and the orientation data from the orientation sensor 59.

The data acquisition module 60 is also operable and configured to communicate or transmit the received sensor data collected to the estimation module 62.

Preferably, the data acquisition module 60 is operable to filter one or more of the above-described types of sensor data received and transmit the filtered sensor data to the estimation module 62. For example, prior to transmitting the received acceleration data to the data acquisition module 60, the acceleration data can be filtered using low or high pass filters depending on the signal desired to be extracted from the acceleration data. In general, filtered sensor data can improve the estimate generated by the estimation module 62 (described below) since the sensor data can be filtered to, for example, remove an unwanted component of the data or extract a desirable component of the data.

Figure 4:
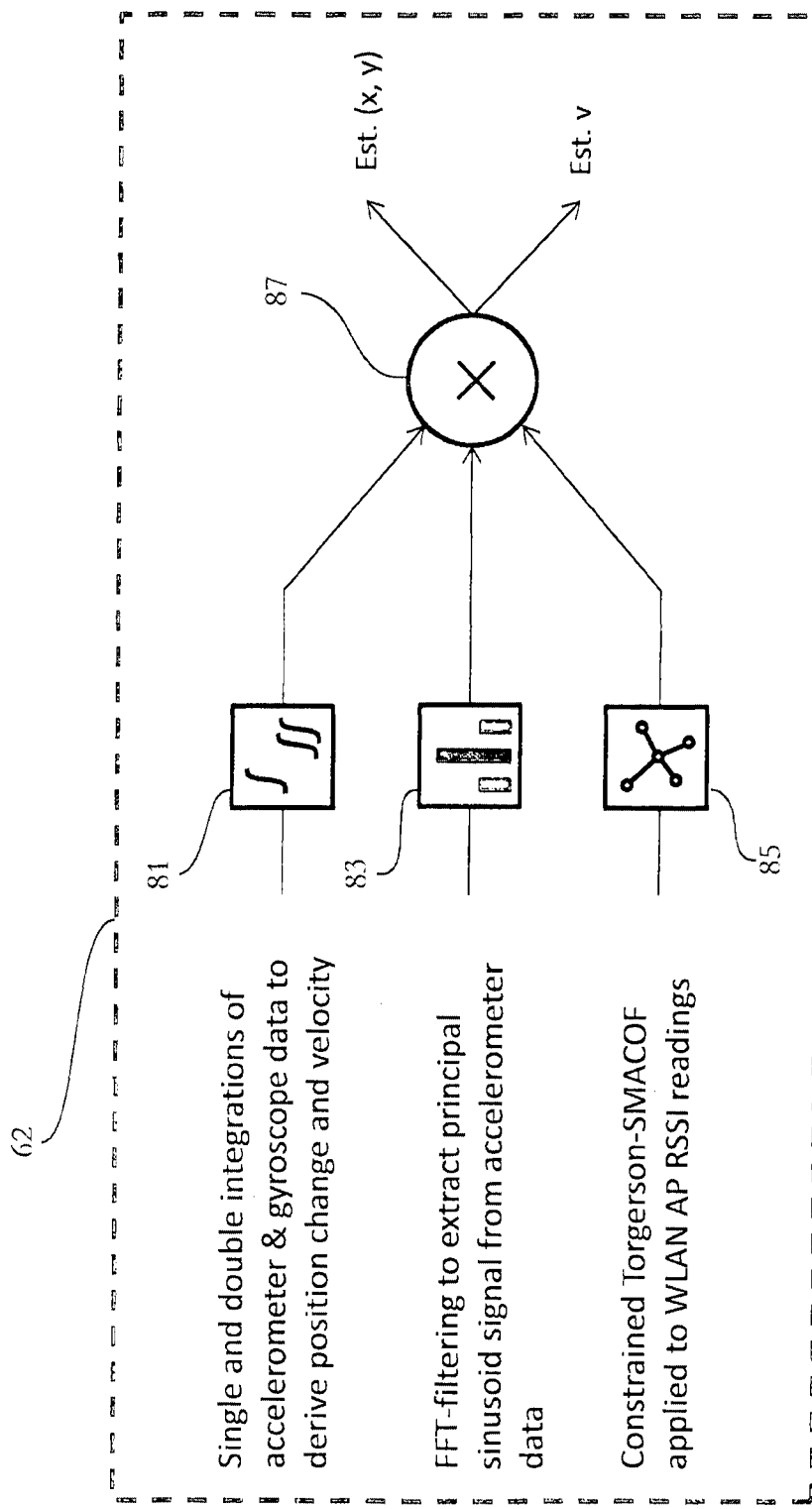
FIG. 4 depicts an exemplary conceptual integration of the multiple inputs according to an embodiment of the present invention.

In one embodiment, estimation module 62 is operable to receive sensor data from the data acquisition module 60. The estimation module 62 is also operable to estimate the state of the mobile station 24 based on the sensor data received. For example, the state of the mobile station 24 includes the position and velocity of the mobile station 24. By way of example and not limitation, the estimation module 62 estimates the position and velocity of the mobile station 24 as described below with reference to FIG. 4.

The estimation module 62 comprises a first estimation section or means 81 for generating a first estimate of the state of the mobile station 24, a second estimation section or means 83 for generating a second estimate of the state of the mobile station 24, and a third estimation section or means 85 for generating a third estimate of the state of the mobile station 24. The estimation module 62 further comprises an adjustment section or means 87 for generating a further or final estimate of the state of the mobile station 24.

In the embodiment described, the first estimation section 81 receives and processes the acceleration data and the orientation data and generates the first estimate. The first estimate includes a position estimate and a velocity estimate of the mobile station 24. Preferably, the first estimation section 81 is operable to integrate the acceleration data received from the acceleration sensor 54 to determine the velocity estimate using an approach or a process known in the art as Dead Reckoning (DR). The velocity estimate is then integrated using the DR approach to determine the position estimate. The velocity estimate and the position estimate determined in such a manner can be respectively referred to as the DR-based velocity estimate and the DR-based position estimate. The first estimation section 81 outputs the DR-based velocity and position estimate to the adjustment section 87.

In the DR approach, the orientation data received from the orientation sensor 55 is used to transform the acceleration data from being reference to the frame of reference (or coordinate system) of the mobile station 24 to the frame of reference (or coordinate system) of the Earth. Accordingly, the DR approach uses the orientation data to map out the DR-based velocity estimate and DR-based position estimate in the three dimensional (3D) space to the Earth's frame of reference. The DR approach in deriving velocity and position estimates is well known to persons skilled in the art and need not be described in any further detail.

The second estimation section 83 receives and processes the acceleration data received from the acceleration sensor 54 and generates the second estimate. The second estimate includes a speed estimate of the mobile station 24. Preferably, the second estimation section 83 is operable to determine the speed estimate of the mobile station 24 based on a filtered acceleration data obtained by filtering a recent history of the acceleration data. Preferably, the acceleration data is filtered by a Fast Fourier Transform filter to derive a power spectrum.

Figure 6:
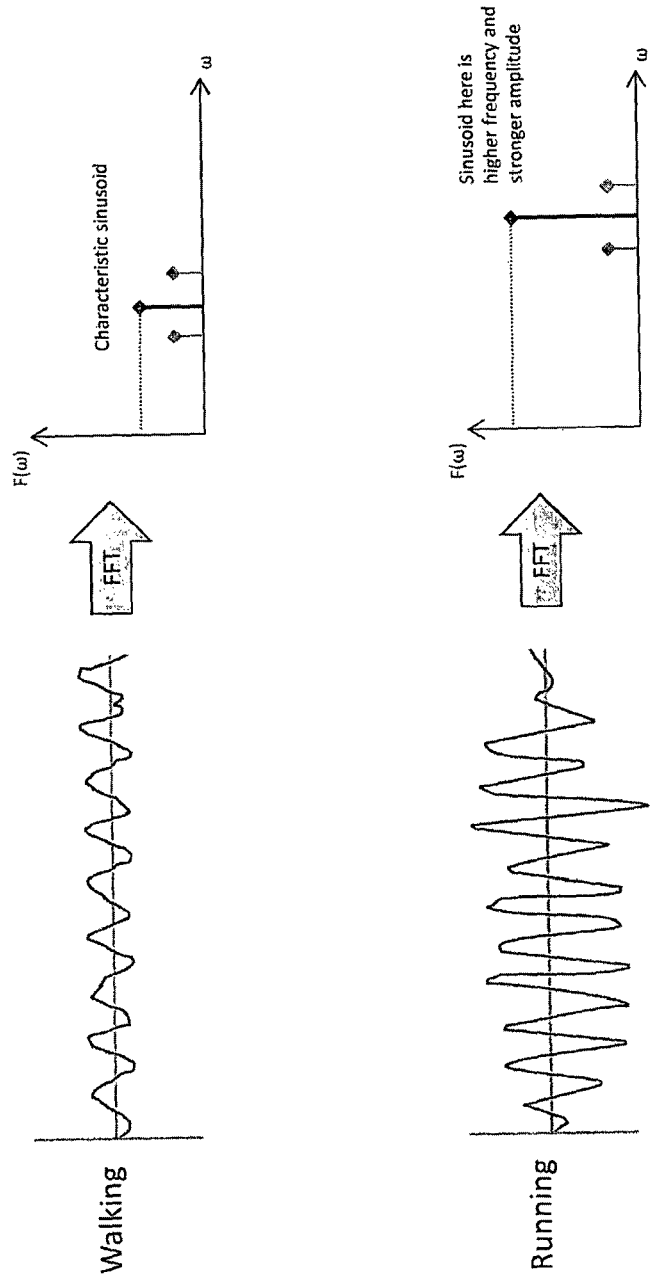
FIG. 6 depicts an exemplary illustration of the difference in the Fast Fourier Transform (FFT) of acceleration data produced in two different states according to the embodiment of the present invention.

For example, the speed estimate can be determined from a power spectrum derived by applying a FFT filter to the recent history of the acceleration data. The Magnitude and frequency of the largest component of the power spectrum is examined to provide a measure of the speed of the mobile station 24. The speed estimate of the mobile station 24 determined in such a manner can be referred to as the HT-based speed estimate. By way of example, two graphs are shown on the left of FIG. 6 representing the acceleration data of the mobile station 24 obtained while in two different states, namely, a walking state and a running state. The two graphs shown on the right of FIG. 6 are corresponding FFT results (power spectrums) of the respective acceleration data. As shown, the power spectrums obtained when the mobile station 24 is in the running state produced a result having a higher frequency and a stronger amplitude than that obtained when the mobile station 24 is in the walking state. Accordingly, the result produced using the FFT provides a speed estimate of the mobile station 24.

Figure 7:
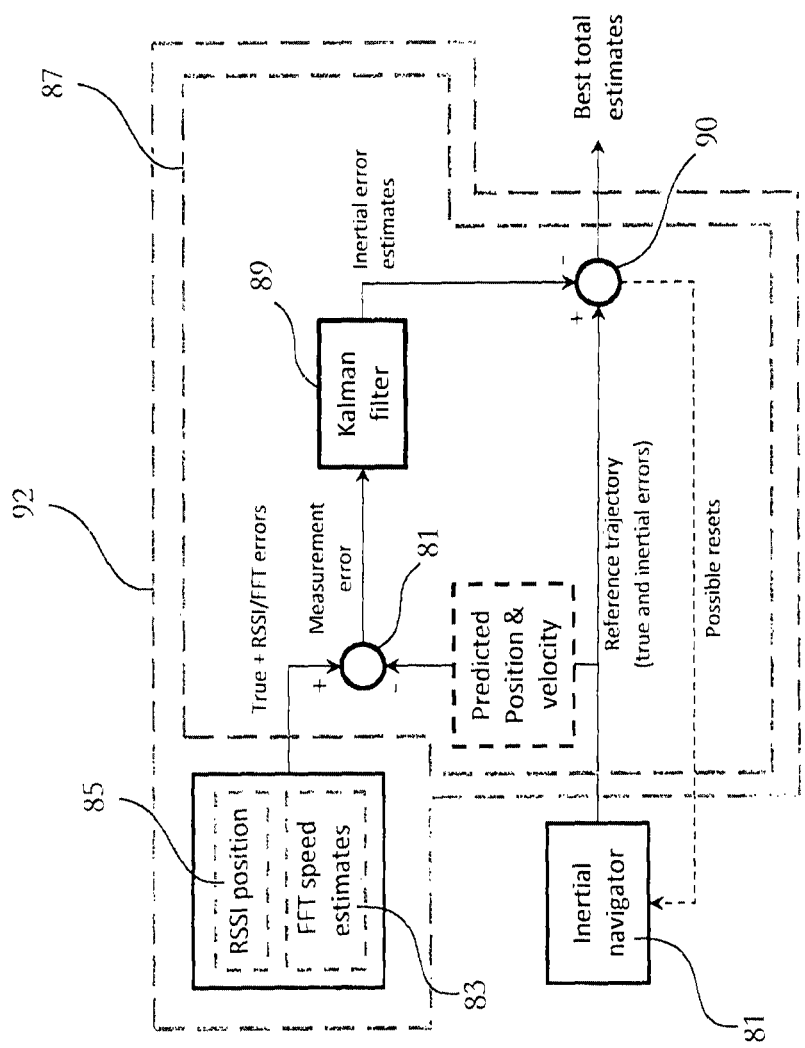
FIG. 7 depicts an exemplary circuit diagram for generating a final estimate of the state of the mobile station according to the embodiment of the present invention.

The third estimation section 85 receives and processes the RSSI data obtained with respect to nearby access points 21, 22 and generates the third estimate. The third estimate includes a position estimate of the mobile station 24. Preferably, the third estimation section 85 is operable to generate the position estimate of the mobile station 24 based on the signal strength sensed at the mobile station 24 with respect to nearby access points 21, 22. For example, the position estimate is determined via a wireless triangulation method using a plurality of the RSSI sensed at the mobile station 24 with respect to nearby access points 21, 22. For instance, the wireless triangulation method is based on a constrained Torgerson-SMACOF algorithm. The constrained Torgerson-SMACOF algorithm is well known to persons skilled in the art and need not be described in any further detail. The position estimate of the mobile station 24 derived in such a manner can be referred as the RSSI-based position estimate. The adjustment section 87 according to a preferred embodiment of the present invention is depicted in FIG. 7. The adjustment section 87 comprises an error determination means 88, a filter section or means 89 and a correction means 90.

The error determination means 88 determines at least one of a position measurement error estimate and a speed measurement error estimate. For example, the error determination means 88 compares the first estimate, which includes the DR-based velocity estimate and the DR-based position estimate, against the second estimate which includes the FFT-based speed estimate and the third estimates which includes the RSSI-based position estimate. For instance, the error determination means 88 generates the speed measurement error estimate by determining a difference between the magnitude of the DR-based velocity estimate and the FFT-based speed estimate to generate a speed measurement error estimate. Similarly, the error determination means 88 determines a difference between the DR-based position estimate and the RSSI-based position estimate to generate a position measurement error estimate.

The filter means 89 is operable to receive and filter the position and speed measurement error estimates for smoothing the data (i.e., reducing noise in the data) so as to improve the accuracy of the measurement error estimates. Preferably, the filter means 89 is a Kalman filter. The Kalman filter method is well known to persons skilled in the art and need not be described in any further detail.

The adjustment section 87 further comprises a correction section or means 90 for receiving and correcting the first estimate based on the measurement error estimates and outputting a corrected first estimate as the final estimate of the state of the mobile station 24. For example, the DR-based velocity and position estimates are respectively corrected by the filtered speed and position measurement error estimates. As a result, weighted averages of the DR-based velocity and position estimates are obtained as the final velocity and position estimates which are then output to the decision module 64.

In the embodiment described, the filtered speed measurement error estimate is also used as a first reset signal for triggering a reset of the first estimation section 81. The first estimation section 81 is triggered by the first reset signal when the filtered speed measurement error estimate becomes more than a predetermined threshold. In the embodiment described, the filtered position measurement error estimate is also used a second reset signal for triggering a reset of the first estimation section 81. The first estimation section 81 is triggered by the second reset signal when the filtered position measurement error estimate becomes more than a predetermined threshold.

Therefore, the first and second reset signals function to maintain the accuracy (within acceptable error range) of the DR-based velocity and position estimates produced by the first estimation section 81 by resetting the first estimation section 81 when the errors in such estimates (accumulated over time) become undesirably large (i.e., more than the predetermined threshold).

According to another embodiment of the present invention, there is provided a system 92 and an associated method for correcting an estimate of a state of the mobile station 24 estimated by a dead reckoning method. The system 92 according to the embodiment is depicted in FIG. 7 and comprises the second estimation section 83, the third estimation section 85 and the adjustment section 87.

For example, the system 92 corrects an estimate of the state of the mobile station 24 estimated by the first estimation section 81. As described hereinbefore, the first estimation section 81 generates an estimate of the state of the mobile station 24, including a velocity and a position of the mobile station 24, based on a Dead Reckoning (DR) process. Therefore, the system 92 corrects the velocity and position estimates determined by the first estimation section 81.

Components of the system 92 have been described in detail hereinbefore and need not be repeated and described in any further detail.

Figure 5:
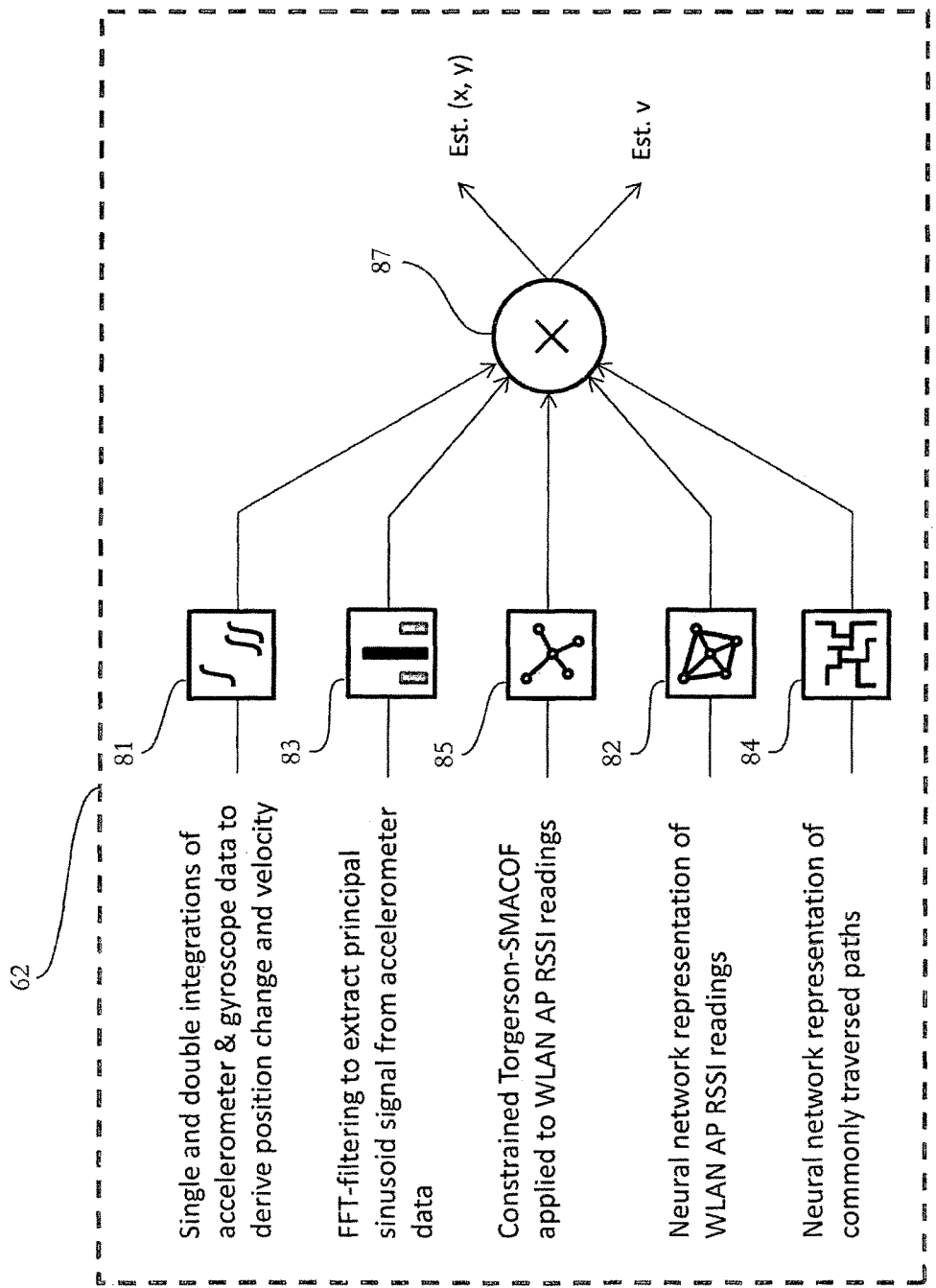
FIG. 5 depicts an exemplary conceptual integration of the multiple inputs according to an embodiment of the present invention.

In another embodiment of the invention, the adjustment section 87 of the estimation module 62 comprises a particle filter, rather than a Kalman filter. The estimation module 62 is operable to receive sensor data from the data acquisition module 60. The estimation module 62 is also operable to estimate the state of the mobile station 24 based on the sensor data received. For example, the state of the mobile station 24 includes the position and velocity of the mobile station 24. By way of example and not limitation, the estimation module 62 estimates the position and velocity of the mobile station 24 as described below with reference to FIG. 5.

In this embodiment, the estimation module 62 comprises a first estimation section or means 81 for generating a first estimate of the state of the mobile station 24, a second estimation section or means 83 for generating a second estimate of the state of the mobile station 24, a third estimation section or means 85 for generating a third estimate of the state of the mobile station 24, a fourth estimation section or means 82 for generating a fourth estimate of the state of the mobile station 24, and a fifth estimation section or means 84 for generating a fifth estimate of the state of the mobile station 24. The estimation module 62 further comprises an adjustment section or means 87 for generating a further or final estimate of the state of the mobile station 24.

The first, second and third estimates are derived as previously described for the first embodiment.

The fourth estimation section 82 receives and processes the RSSI data obtained with respect to nearby access points 21, 22 and generates the fourth estimate. The fourth estimate includes a position estimate of the mobile station 24. Preferably, the fourth estimation section 82 is operable to generate the position estimate of the mobile station 24 based on the signal strength sensed at the mobile station 24 with respect to nearby access points 21, 22. In the described example, the position estimate is determined from an approximation model of signal strengths stored as a feed-forward multi-layer perceptron neural network. In alternative embodiments of the invention it may be determined by other methods, such as a radial basis function network, using a plurality of the RSSI sensed at the mobile station 24 with respect to nearby access points 21, 22. In the embodiment, the approximation model is based on historical RSSI data collected by one or more mobile devices within the environment surrounding the access points. These data are used to train a neural network or radial basis function network to estimate a spatial location given a set of RSSI readings. The position estimate of the mobile station 24 derived in such a manner can be referred as the neural network based position estimate.

The fifth estimation section 84 uses a representation of commonly traversed paths through the environment surrounding the access points, derived from a history of the motions of a plurality of mobile devices over a period of time. This representation comprises numerical values defining a feed-forward, multi-layer perceptron neural network, or a radial basis function network, which has been trained to provide an approximation of the probability of a particular location in the environment surrounding the access points being occupied by a mobile device.

The adjustment section or means 87 comprises a particle filter to estimate position and velocity, given probability density functions derived from the five estimates 81,82,83, 84 and 85. The particle filter method is well known to persons skilled in the art and need not be described in any further detail.

The decision module 64 is operable to make a handover decision in the multi-cell wireless network 26 from a serving access point 21 to a target access point 22 based on the final position and velocity estimates received from the estimation module 62. In particular, the decision module 64 determines whether to implement the handover decision at least based on a projected or predicted state of the mobile station 24, whereby the projected state of the mobile station 24 is determined based on the final position and velocity estimates.

By way of example and not limitation, the decision module 64 is operable to make a handover decision based on the following steps, assuming the serving access point is AP A and the possible alternative access points are AP $B_I$:

1. Receive the final position and velocity estimates of the mobile station 24 at time t from the estimation module 62;
2. Predict the position of the mobile station 24 at time t+Δ based on the received final position and velocity estimates;
3a. If the position of the mobile station 24 predicted at time t+Δ is the same as the position of the mobile station 24 at time t (i.e., velocity of the mobile station 24 is zero), a negative handover decision is made and return to step 1;
3b. Otherwise, for each Access Point "$B_i$" in total set of alternative Access Points: If Position of Mobile Station 24 is closer to AP $B_I$ than AP A, and predicted future position is closer to AP $B_i$ than AP A, then execute a handover from AP A to the AP $B_I$ in the set closest to the predicted future position of the Mobile Station 24.

In Step 3b, the distance between the mobile station 24 and the serving access point and the distances between the mobile station 24 and the possible alternative access points are determined with reference to the contextual data received from the server 32. Although in Step 3b, the comparison is based on distances, it will be apparent to persons skilled in the art that the comparison can instead be based on other factors such as the field strength sensed by the mobile station 24.

Therefore, the method and system according to the embodiment described incorporates predictive capabilities for making a handover decision in the multi-cell wireless network 26. In contrast, existing methods for making a handover decision as discussed in the background art relies on a reactive (or lagging) capabilities (e.g., relying only on the RSSI to make handover decisions). The predictive capabilities according to the embodiment described have been found to improve the accuracy of handover decisions made and thus enhance the reliability and quality of the communication between the mobile station 24 and the multi-cell wireless network 26.

By way of example, the predictive capability of the embodiment described may result in the prediction of a future location that is closer to a candidate access point than to the current access point. However, projection further into the future may show that the candidate access point will only used briefly as the wireless enabled mobile device rapidly passes it by, with a second candidate access point being a more optimal connection in the longer term. In this case, the predictive handover algorithm may choose to make a negative handover decision in the short-term, preferring to delay handover until a more optimal access point for the trajectory of the wireless enabled mobile device is available.

From the described embodiments of the invention, it can be appreciated that a decision to implement an action, such as handover decisions, may be made more optimal by including information about the location and velocity of the mobile device relative to the wireless access points.

While localization based on a single source of information such as RSSI tends not to be sufficiently accurate, multiple sources of location information may be combined using a recursive Bayes filter, such as a Kalman filter or particle filter, to create a location estimate that is more accurate than that available from any one source. Each location measure has a region of uncertainty associated with it, typically visualized as an elliptical distribution. Using a recursive Bayes filter with multiple probability density functions (PDFs) as inputs results in a predicted probability density function for location which has lower variance than any of the input PDFs.

For example, data from gyroscopes, accelerometers and magnetometers may be combined to derive net acceleration vectors, which may be integrated to give velocity, and further integrated to give displacement. These integrations provide a basic inertial navigation system, which may be used for short-term, dead reckoning (DR) navigation.

While such a system may provide a good estimation of the direction of movement, integration errors rapidly accumulate, making estimates of distance travelled inaccurate after only a few seconds. On the other hand, acceleration in the vertical direction can be analysed to determine footfalls, which can provide a good estimate of stride length and speed, but not direction. By combining the probability density functions of these two sources of information using a recursive Bayes filter, an improved estimate of user velocity (i.e. speed, and direction) may be derived.

RSSI based handover methods use the relative strengths of signals received from multiple access points and consequently may not require any knowledge of the location of the wireless enabled mobile device in Euclidean space. A handover method that incorporates data from gyroscopes, accelerometers and magnetometers operates in Euclidean space and incorporate methods to map RSSI measures into Euclidean co-ordinates. As a result of this mapping into Euclidean space, the location data derived by the system or method is of use to other localization problem domains and is not simply restricted to the handover problem.

In an unobstructed outdoor environment GPS is able to locate a moving user with good accuracy. However, for an indoor environment, GPS signals tend to be poor, requiring other methods of locating the mobile device. Wireless handover is not the only problem domain in which accurate determination of location, herein referred to as localization, is of value in an environment in which wireless signals are present, but where GPS signals may be weak or unusable. Improvements to methods for accurately determining the location of a wireless communication device in such an environment may be of benefit to a variety of applications.

Although the present invention has been described above with particular reference to an action comprising a handover or handoff decision in a multi-cell wireless network, it will be appreciated that the invention may be used in respect of other telecommunication systems and networks and to implement actions other than, or additional to, handover or handoff decision making. In addition, although the present invention has been described above with particular reference to a local area cellular network, it will be apparent to persons skilled in the art that the present invention can also be applied variants such as a wide area cellular network.

For example, the system according to the above-described embodiment of the present invention can be adapted to operate devices, such as unlocking electronic locked doors, automatically as the user carrying the mobile station approaches a nominated security zone. Other additional or alternative actions may include, for example, determining and providing notification of a location or position in an indoor environment. In the case where the indoor environment is a museum, the notification may include directions to a particular display of interest, or in the case of a shopping centre, to one or more goods for sale.

It should be appreciated by the person skilled in the art that the invention is not limited to the embodiments described. For example, the invention as described can include the following modifications and/or additions.

In embodiments of the invention, data may be provided to the mobile station 24 as an input from one or more sensors 50, as in the embodiments hereinbefore described, and/or may originate elsewhere. In one particular embodiment, the input comes from a store of information, details or knowledge of or associated with the wireless communication network, including a network topology, including physical and logical topology, and a network performance, accessible by or otherwise communicated to the mobile station 24.

This store provides an additional source of data for use by the estimation module 62 for generating a respective one of the plurality of estimates of the state of the mobile station 24. In such embodiments the system is operable to use relevant network topology information, such as relative base station positions or underlying (fixed) network geometry, for example, in combination with data from one or more other sources, such as from the set of sensors 50, to estimate the state of the mobile station 24. In this manner, a fixed reference frame (of or associated with the network topology) is linked or related to a dynamic reference frame (of or associated with the mobile station 24) to make the decision to implement or undertake the action, i.e. handover in the embodiments described.

It will be appreciated by those skilled in the art that variations and modifications to the invention described herein will be apparent without departing from the spirit and scope thereof. The variations and modifications as would be apparent to persons skilled in the art are deemed to fall within the broad scope and ambit of the invention as herein set forth.

Throughout the specification, unless the context requires otherwise, the word "comprise" or variations such as "comprises" or "comprising", will be understood to imply the inclusion of a stated integer or group of integers but not the exclusion of any other integer or group of integers.

Furthermore, throughout the specification, unless the context requires otherwise, the word "include" or variations such as "includes" or "including", will be understood to imply the inclusion of a stated integer or group of integers but not the exclusion of any other integer or group of integers.

Additionally, throughout the specification, unless the context requires otherwise, the words "substantially" or "about" will be understood to not be limited to the value for the range qualified by the terms.

The invention claimed is:

1. A system comprising:
   at least one sensor for sensing and gathering sensor data relating to a position and a velocity of a wireless communication enabled device, wherein the wireless communication enabled device comprises an estimation means for receiving the sensor data and generating a at least three estimates of the position and the velocity of the wireless communication enabled device based on the sensor data, and a decision means for projecting a state of the wireless communication enabled device based on the at least three estimates of the position and the velocity of the wireless communication enabled device, and for selecting a target access point, and for determining whether to implement the handover to the target access point, based on the projected state of said device; wherein the system implements the handover of a connection the wireless communication enabled device has established with a serving access point of a plurality of access points of a wireless communication network to the target access point of the plurality of access points, the wireless communication enabled device being operable to communicate with the wireless communication network.

2. The system of claim 1, wherein the wireless communication enabled device further comprises the at least one sensor.

3. The system of claim 1, wherein the wireless communication enabled device further comprises an acquisition means for receiving the sensor data and outputting the sensor data to the estimation means.

4. The system of claim 1, wherein the at least one sensor comprises at least one of an acceleration sensor, an orientation sensor, a direction sensor and a position sensor.

5. The system of claim 4, wherein when the at least one sensor comprises an acceleration sensor, the acceleration sensor is: operable to measure an acceleration of the wireless communication enabled device and to generate an acceleration data based on the acceleration measured; and/or an accelerometer; and/or operable to sense accelerations in three orthogonal axes.

6. The system of claim 4, wherein when the at least one sensor comprises an orientation sensor, the orientation sensor is: operable to measure a rate of change of the orientation of the wireless communication enabled device and to generate an orientation data based on the rate of change of the orientation measured; and/or a gyroscope;
and/or operable to sense rotations in three orthogonal axes.

7. The system claim 4, wherein when the at least one sensor comprises a direction sensor, the direction sensor is: operable to determine a direction relative to the Earth's magnetic poles; and/or an electronic compass; and/or comprises a magnetometer operable to sense the Earth's magnetic field in three orthogonal axes.

8. The system of claim 4, wherein when the at least one sensor comprises a position sensor, the position sensor is: operable to determine a position of the wireless communication enabled device; and/or a Global Positioning System (GPS).

9. The system of claim 1, wherein the estimation means comprises a first estimation means for generating an estimate of the position and the velocity of the wireless communication enabled device, a second estimation means for generating an estimate of a speed of the wireless communication enabled device, and a third estimation means for generating an estimate of the position of the wireless communication enabled device.

10. The system of claim 9, wherein the estimation means further comprises a fourth estimation means for generating a fourth estimate of the state of the wireless communication enabled device, and a fifth estimation means for generating a fifth estimate of the state of the wireless communication enabled device.

11. The system of claim 9, wherein the estimate of the velocity and the position is determined based on acceleration data received from an acceleration sensor and orientation data received from an orientation sensor.

12. The system of claim 11, wherein the estimate of the velocity is determined by integrating the acceleration data and the estimate of the position is determined by integrating the estimate of the velocity based on a dead reckoning method.

13. The system of claim 9, wherein the estimate of the speed of the wireless communication enabled device is determined based on acceleration data received from an acceleration sensor.

14. The system of claim 13, wherein the estimate of the speed is determined based on a filtered acceleration data.

15. The system of claim 14, wherein the filtered acceleration data is obtained by filtering the acceleration data with a Fast Fourier Transform (FFT) filter to derive a power spectrum.

16. The system of claim 9, wherein the estimate of the position of the wireless communication enabled device comprises a position estimate of the wireless communication enabled device determined based on a RSSI received from a signal strength sensor.

17. The system of claim 16, wherein the position estimate is determined via a wireless triangulation method using the RSSI received at the wireless communication enabled device.

18. The system of claim 17, wherein the wireless triangulation method is based on a constrained Torgerson-SMACOF algorithm.

19. The system of claim 10, wherein the estimate of the position of the wireless communication enabled device generated from the fourth estimation means is determined based on a representation of RSSI received by one or more devices at different times and locations within the environment of or surrounding the wireless enabled communication device.

20. The system of claim 10, wherein the estimate of the position of the wireless communication enabled device generated from the fifth estimation means is determined based on a representation of common paths traversed by the wireless communication device and/or other wireless communication devices within the environment of or surrounding the wireless enabled communication device.

21. The system of claim 20, wherein the representation comprises: a map; and/or numerical values defining a feed-forward, multi-layer perceptron neural network; and/or a radial basis function network.

22. The system of claim 1, wherein the estimation means further comprises an adjustment means for generating a final estimate of the position and the velocity of the wireless communication enabled device based on the plurality of estimates.

23. The system of claim 22, wherein the adjustment means comprises a correction means for correcting the position estimate based on a position measurement error estimate and outputting a corrected position estimate as the final estimate of the position.

24. The system of claim 23, wherein the adjustment means further comprises a filter means operable to receive and filter the plurality of estimates prior to being outputted to the correction means.

25. The system of claim 24, wherein the filter means comprises a recursive Bayes filter.

26. The system of claim 25, wherein the recursive Bayes filter comprises a Kalman filter.

27. The system of claim 25, wherein the recursive Bayes filter comprises a particle filter.

28. The system of claim 22, wherein the adjustment means further comprises an error determination means for determining at least one of a position measurement error estimate and a velocity measurement error estimate.

29. The system of claim 28, wherein the position measurement error estimate is determined based on a difference between three estimates of the position or velocity.

30. The system of claim 28, wherein the error determination means comprises a correction means for correcting the velocity estimate based on a speed measurement error estimate and outputting a corrected velocity estimate as the final velocity estimate.

31. The system of claim 22, wherein the error determination means further comprises a filter means, wherein the filter means receives and filters at least one of the position measurement error estimate and the velocity measurement error estimate prior to being outputted to the adjustment means.

32. The system of claim 31, wherein the filter means comprises a recursive Bayes filter.

33. The system of claim 32, wherein the recursive Bayes filter comprises a Kalman filter.

34. The system of claim 32, wherein the recursive Bayes filter comprises a particle filter.

35. The system of claim 1, wherein the estimation means is caused to reset when at least one of a position measurement error estimate and a velocity measurement error estimate exceeds a predetermined threshold.

36. A system comprising: at least one sensor for sensing and gathering sensor data relating to a position and a velocity of a wireless communication enabled device,
wherein the wireless communication enabled device comprises an estimation means for receiving the sensor data and generating at least three estimates of the position and the velocity of the wireless communication enabled device based on the sensor data, and
a decision means for projecting a state of the wireless communication enabled device based on the at least three estimates of the position and the velocity of the wireless communication enabled device, and for selecting a target access point, and for determining whether to implement the handover to the target access point, based on the projected state of said device;
wherein the decision means determines to implement the handover if the projected state of the wireless communication enabled device includes a position which is closer to the target access point than the serving access point and wherein the system implements the handover of a connection the wireless communication enabled device has established with a serving access point of a plurality of access points of a wireless communication network to the target access point of the plurality of access points, the wireless communication enabled device being operable to communicate with the wireless communication network.

37. The system of claim 36, wherein the projected state is a position determined by extrapolating a final position estimate in a linear manner using the position estimate and the velocity estimate.

38. The system of claim 1 or claim 36, wherein the wireless communication enabled device further comprises a processor for executing instructions, and wherein the estimation means and the decision means are implemented as sets of instructions stored in a computer-readable storage medium accessible by the processor.

39. A method comprising: sensing and gathering data relating to a position and a velocity of a wireless communication enabled device; generating at least three estimates of the position and the velocity of the wireless communication enabled device based on the data; projecting a state of the wireless communication enabled device based on the at least three estimates of the position and the velocity of the wireless communication enabled device; selecting a target access point; and determining whether to implement the handover to the target access point, based on the projected state of said device; wherein the method implements the handover of a connection the wireless communication enabled device has established with a serving access point of a plurality of access points of a wireless communication network to the target access point of the plurality of access points, the wireless communication enabled device being operable to communicate with the wireless communication network.

40. The method of claim 39, wherein the step of sensing and gathering data relating to the position of the wireless communication enabled device comprises determining a state of the environment surrounding the wireless communication enabled device wherein said state: one or more signal strengths associated with the wireless communication network; and/or data, information, details or knowledge of or associated with the wireless communication network.

41. The method of claim 40, wherein the data comprises signal strength data.

42. The method of claim 41, wherein the signal strength data comprises Received Signal Strength Indication (RSSI) measured at the wireless communication enabled device with respect to one or more of a plurality of access points of the wireless communication network.

43. The method of claim 39, wherein said generating a plurality of estimates comprises generating an estimate of the position and the velocity of the wireless communication enabled device, generating an estimate of the speed of the wireless communication enabled device, and generating an estimate of the position of the wireless communication enabled device.

44. The method of claim 43, wherein said generating a plurality of estimates further comprises generating two further estimates of the position of the wireless communication enabled device.

45. The method of claim 43, wherein the estimate of the position and the velocity is based on data related to a velocity and a position of the wireless communication enabled device determined from acceleration data and an orientation data pertaining to the wireless communication enabled device.

46. The method of claim 45, wherein the data related to the velocity is determined by integrating the acceleration data and the data related to the position is determined by integrating the data related to the velocity based on a dead reckoning method.

47. The method of claim 43, wherein the estimate of the speed of the wireless communication enabled device is determined based on acceleration data pertaining to the wireless communication enabled device.

48. The method of claim 47, wherein the acceleration data is filtered acceleration data.

49. The method of claim 48, wherein the filtered acceleration data is obtained by filtering the acceleration data with a Fast Fourier Transform (FFT) filter to derive a power spectrum.

50. The method of claim 43, wherein the estimate of the position is based on data related to a position of the wireless communication enabled device determined based on RSSI pertaining to the wireless communication enabled device.

51. The method of claim 50, wherein the RSSI is determined via a wireless triangulation method using the said RSSI.

52. The method of claim 51, wherein the wireless triangulation method is based on a constrained Torgerson-SMACOF algorithm.

53. The method of claim 44, wherein one of the further estimates of the position is determined based on a representation of RSSI received by one or more devices at different times and locations within the environment of or surrounding the wireless enabled communication device.

54. The method of claim 44, wherein one of the further estimates of the position is determined based on a representation of common paths traversed within the environment of or surrounding the wireless enabled communication device.

55. The method of claim 53 or 54, wherein the representation comprises: a map; and/or numerical values defining a feed-forward, multi-layer perceptron neural network; and/or a radial basis function network.

56. The method of claim 39 further comprising determining a final estimate of the position and the velocity of the wireless communication enabled device based on two or more of the plurality of estimates.

57. The method of claim 56, wherein the step of determining a final estimate of the position and the velocity comprises correcting the position estimate based on a position measurement error estimate and outputting the corrected position estimate as the final estimate.

58. The method of claim 57, further comprising filtering the position estimate prior to said correcting.

59. The method of claim 58, wherein said filtering comprises using a recursive Bayes filter.

60. The method of claim 59, wherein the recursive Bayes filter comprises a Kalman filter.

61. The method of claim 59, wherein the recursive Bayes filter comprises a particle filter.

62. The method of claim 56, wherein said two or more of the plurality of estimates comprise three estimates.

63. The method of claim 39 further comprising resetting the step of generating a plurality of estimates of the position and the velocity of the wireless communication enabled device when at least one of a position measurement error estimate and a velocity measurement error estimate exceeds a predetermined threshold.

64. A method comprising: sensing and gathering data relating to a position and a velocity of a wireless communication enabled device;
generating at least three estimates of the position and the velocity of the wireless communication enabled device based on the data; projecting a state of the wireless communication enabled device based on the at least three estimates of the position and the velocity of the wireless communication enabled device: selecting a target access point; and determining whether to implement the handover to the target access point, based on the projected state of said device; wherein, the handover is implemented if the projected state of the wireless communication enabled device includes a position which is closer to the target access point than the serving access point and wherein the method implements the handover of a connection the wireless communication enabled device has established with a serving access point of a plurality of access points of a wireless communication network to the target access point of the plurality of access points, the wireless communication enabled device being operable to communicate with the wireless communication network.

65. The method of claim 64, wherein, said determining comprises using an algorithm that determines whether the target access point is more favourable than the serving access point, given at least a projected location, speed and direction of travel of the wireless communication enabled device as parameters.

66. The method of claim 64, wherein the position of the projected location is determined by linear extrapolation from the position estimate.

67. A non-transitory computer-readable storage medium on which is stored instructions that, when executed by a computing means, causes the computing means to carry out the method according to claim 39 or 64.

68. A computing means programmed to carry out the method according to claim 39 or 64.

69. A data signal including at least one instruction being capable of being received and interpreted by a computing system, wherein the instruction implements the method according to claim 39 or 64.

70. A wireless communication enabled device for use with the system of claim 1 or the method of claim 39 or 64.

71. The system of claim 1, wherein the at least one sensor further comprises a sensor for sensing and gathering sensor data related to a state of the environment surrounding the wireless communication enabled device wherein said state includes: one or more signal strengths of or associated with the wireless communication network; and/or data, information, details or knowledge of or associated with the wireless communication network.

72. The system of claim 8, wherein the sensor for sensing and gathering sensor data related to a state of the environment surrounding the wireless communication enabled device comprises a signal strength sensor.

73. The system of claim 72, wherein the signal strength sensor is operable to measure the signal strength at the wireless communication enabled device associated with one or more of a plurality of access points for the wireless communication network and generate a signal strength indicator in the form of a Received Signal Strength Indication (RSSI) based on the signal strength measured with respect to each of the one or more of the plurality of access points.

74. The system of claim 19, wherein the representation of RSSI is a map.

75. The method of claim 39, wherein the data comprises acceleration data, orientation data, direction data or position data.

76. The method of claim 75, wherein when the data comprises acceleration data, the acceleration data is determined based on an acceleration of the wireless communication enabled device in three orthogonal axes.

77. The method of claim 75, wherein when the data comprises orientation data, the orientation data is determined based on a rate of change of the orientation of the wireless communication enabled device in three orthogonal axes.

78. The method of claim 75, wherein when the data comprises direction data, the direction data is determined based on a direction relative to the Earth's magnetic poles in three orthogonal axes.

79. The method of claim 75, wherein when the data comprises position data, the position data is determined based on a position of the wireless communication enabled device generated by a Global Positioning System (GPS).

* * * * *